April 29, 1969  L. L. ARNES  3,441,248

VALVE

Filed Jan. 5, 1966

INVENTOR.
Lyle L. Arnes
BY
Harness, Dickey & Pierce
ATTORNEYS.

United States Patent Office 3,441,248
Patented Apr. 29, 1969

3,441,248
VALVE
Lyle L. Arnes, Racine, Wis., assignor to Walker Manufacturing Company, a corporation of Delaware
Filed Jan. 5, 1966, Ser. No. 518,804
Int. Cl. F16k 1/02, 1/36, 27/08
U.S. Cl. 251—277                                1 Claim

ABSTRACT OF THE DISCLOSURE

Breakaway torque on a release valve is reduced by providing the valve with a shaft that is freely movable inside of a socket on the threaded valve operator. The shaft changes in length when the valve is threaded home and acts as a spring to hold the valve on its seat until thread friction is overcome during release of the valve. An O-ring provides a simple seal between the valve operator and the valve passage.

---

This invention relates to a valve construction and more particularly to an improved valve construction wherein the valve seating loads are not imposed directly upon the valve operating member.

In one common form of fluid valve, the valve member has a valve face that is brought into seating engagement with a valve seat by means of a screw threaded operator. This type of valve is commonly used as a release valve in a hydraulic jack wherein the valve is employed to bleed the cylinder and lower the jack. Frequently, an accurate control over the degree of release is desirable. With the aforementioned type of valve, however, the valve seating load is quite high. That is, the compressive force exerted upon the mating valve surfaces is so high that considerable friction load is encountered when the valve is turned to release it. This friction load coupled with the normal friction load of the screw threads of the valve operator makes initial release difficult. Once the valve is moved away from its seat, the valve seating load is suddenly removed from the valve operating member and the operator tends to over open the valve.

It is, therefore, a principal object of this invention to provide an improved valve mechanism wherein the breakaway load upon the valve operator is reduced.

It is a still further object of this invention to provide an improved release valve for a hydraulic jack.

A release valve assembly for a hydraulic jack embodying this invention is comprised of means defining a fluid passage. A valve seat is interposed in the fluid passage and a valve member is supported with its valve face adapted to engage the valve seat for precluding flow through the passage. A valve operating member is supported in part by a screw threaded connection for axial movement of the valve operating member upon its rotation. An anti-friction connection is provided between the valve member and the valve operating member for relieving of threaded connection of the frictional seating loads between the valve member face and the valve seat.

Other objects and advantages of this invention will become more apparent as this description proceeds, particularly when considered in conjunction with the accompanying drawings, wherein.

Figure 1:
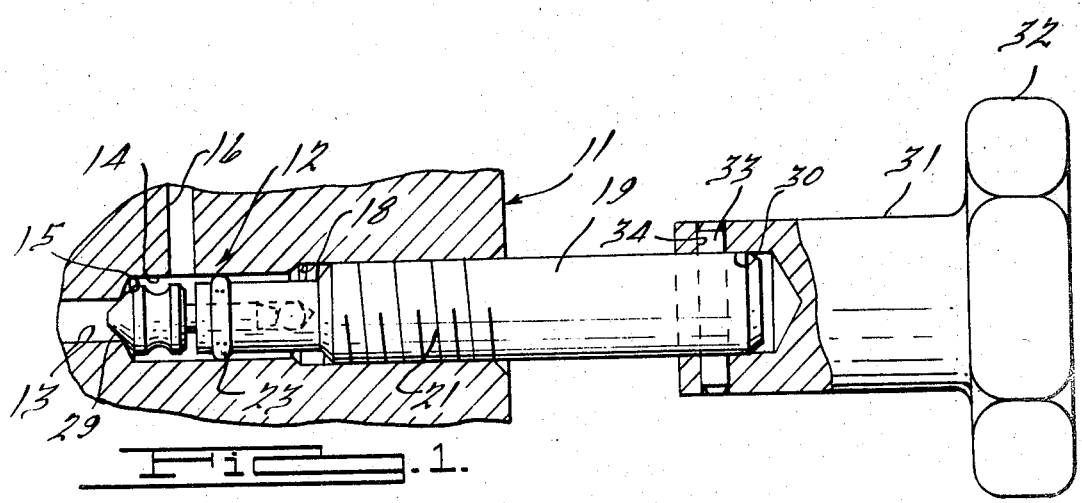
FIGURE 1 is a cross-sectional view of a portion of a hydraulic jack embodying this invention and showing its release valve in detail.

Referring now in detail to the drawings, a hydraulic jack assembly embodying this invention is illustrated partially and identified generally by the reference numeral 11. The jack assembly 11, for the most part, may be considered conventional and hence is not shown in any detail. Reference may be had to Patent No. 2,687,873, entitled One End Lift, issued Aug. 31, 1954, and assigned to the assignee of this invention for a typical jack assembly with which this invention can be used.

The jack assembly 11 includes a release valve, indicated generally by the reference numeral 12, for bleeding high pressure fluid from the jack cylinder to a sump (not shown). The release valve assembly 12 is comprised of a fluid passage 13 that leads from the cylinder and terminates in an enlarged bore 14 with a valve seat 15 being formed at the juncture between the passage 13 and the bore 14. The bore 14 is intersected by a radially extending fluid passage 16 that leads to the sump. The bore 14 terminates at a larger diameter female screw threaded portion 18 that opens through the side of the jack assembly 11.

A valve operating member 19 having a male threaded portion 21 is threaded into the female threaded portion 18 of the jack assembly 11. Adjacent the inner end of the male threaded portion 21, the valve operating member 19 is formed with a reduced diameter portion 22 that extends into the bore 14. An O-ring seal 23 is received in a circumferential groove 24 formed in the inner end of the reduced diameter portion 22 and engages the periphery of the bore 14 to preclude fluid leakage toward the threaded connection between the members 18 and 21.

A cylindrical socket 25 is drilled coaxially into the portion 22 and a slightly smaller diameter stem portion 26 of a valve member, indicated generally by the reference numeral 27, is received within the socket 25. An anti-friction ball 28, which is preferably a hardened steel ball bearing, is interposed between the base of the socket 25 in the inner end of the valve stem portion 26. Opposite the stem portion 26, the valve member 27 is provided with a tapered valve face 29 that is adapted to engage the valve seat 15 and preclude fluid communication between the passages 13 and 16.

The outer end of the valve operating member 19 is received in a socket 30 (FIGURE 1) formed in a valve operating handle 31 having a knob portion 32 formed at its outer end. A pin 33 is driven through a bore 34 in the operating handle 31 and a corresponding bore in the valve operating member 19 to fix the valve operating member 19 and handle 31 with respect to each other.

Figure 2:
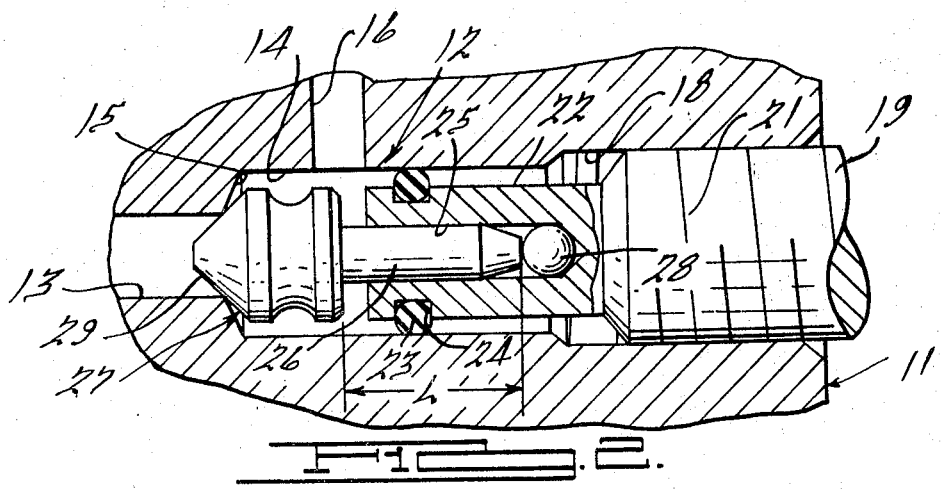
FIGURE 2 is an enlarged cross-sectional view of the valve member and cooperating seat from the jack assembly shown in FIGURE 1.
Figure 3:
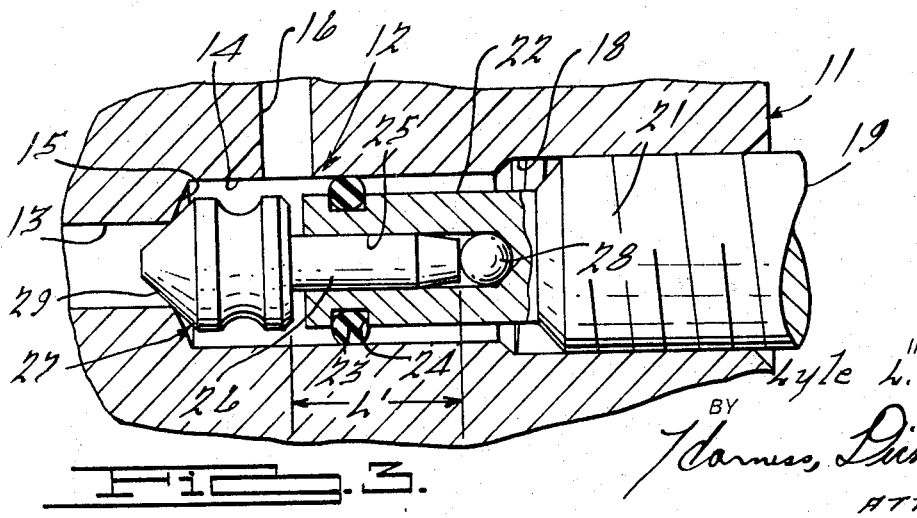
FIGURE 3 is a cross-sectional view, in part similar to FIGURE 2, showing the valve mechanism in another position.

In operation, the valve member 27 is brought to its closed position by turning the handle 31 in an appropriate direction so that the screw threaded connection formed by the threaded members 18 and 21 causes the valve operating member 19 to move axially toward the valve seat 15. This movement will be transmitted through the ball 28 to the stem portion 26 of the valve member 27. When the valve face 29 of the valve member initially contacts the valve seat 15 (FIGURE 2), there will be a possibility of some fluid leakage. To insure complete seating, the valve operating member 19 is rotated further to increase the sealing pressure. When this occurs, the valve stem portion 26, which is formed from steel, will resiliently deform with an effective decrease in its length, as indicated by the difference in the dimension L and L' in FIGURES 2 and 3. This resilient deflection of the stem portion 26 causes in effect a resilient seating force to be exerted upon the valve member 27.

When it is desired to open the valve member 27 and drain fluid from the hydraulic cylinder of the jack through the passages 13 and 16, the valve operating handle 31 is rotated to cause axial movement of the valve operating member 19 away from the valve seat 15. It will be noted that the frictional forces between the valve face 29 and valve seat 15 will not be experienced by the operator during this rotation due to the ball and socket connection between the valve member 27 and a valve operating member 19. During this initial rotation, the valve face 29 will be held against its seat by the compression of the shaft portion 26 so that thread friction may first be overcome. Continued rotation will then cause the valve face 29 to be moved away from its valve seat, because of the hydraulic pressure acting upon its surface and a smooth and accurate return flow will be effected.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

1. A valve assembly comprised of means defining a fluid passage, a valve seat interposed in said fluid passage, a valve member having a valve face adapted to engage said valve seat for precluding flow through said passage, a valve operating member, means supporting said valve operating member, a screw threaded connection between said last named means and said valve operating member for axial movement of said valve operating member upon relative rotation between said valve operating member and said last named means, and an anti-friction connection between said valve member and said valve operating member for relieving said threaded connection from the seating loads upon said valve member valve face, said anti-friction connection comprising a projecting portion on said operating member extending in said passage and smaller in diameter than said passage and having an elongated cylindrical socket therein opening out of the end thereof facing said valve seat, the valve member having a shaft portion extending in and freely movable longitudinally and rotatably inside said socket, said valve member and its shaft being freely movable axially relative to the valve operating member, a ball interposed between and engaging the end of said shaft portion and the bottom of said socket, said shaft portion being resiliently deformable under seating loads for exerting a resilient seating force upon the valve face, said resilient seating force lasting during at least the initial stage of unloosening of the threaded connection while thread friction is overcome, a groove on the periphery of said projecting portion, and an O-ring in said groove engaging the wall of said passage to prevent fluid from reaching said threaded connection.

References Cited
UNITED STATES PATENTS

| | | | |
|---|---|---|---|
| 1,276,715 | 8/1918 | Briedenbach | 251—273 |
| 1,612,533 | 12/1926 | Poindexter | 251—275 |
| 2,669,415 | 2/1954 | Gilroy | 251—215 |
| 3,049,332 | 8/1962 | Webster | 251—274 X |
| 3,204,925 | 9/1965 | Montuori | 251—274 |

WILLIAM F. O'DEA, *Primary Examiner.*

DAVID R. MATTHEWS, *Assistant Examiner.*

U.S. Cl. X.R.

251—214